April 19, 1938.  G. L. HELLER ET AL  2,114,738
CARBON PIGMENT PRODUCING FURNACE
Filed June 19, 1937

INVENTORS
GEORGE L. HELLER
HAROLD M. WILGUS
BY
Kenneth J. White  ATTORNEY

Patented Apr. 19, 1938

2,114,738

UNITED STATES PATENT OFFICE 2,114,738

CARBON PIGMENT PRODUCING FURNACE

George L. Heller, Pampa, Tex., and Harold M. Wilgus, Merrick, N. Y., assignors to General Atlas Carbon Company, Dover, Del., a corporation of Delaware Application June 19, 1937, Serial No. 149,056

8 Claims. (Cl. 134—60)

This invention relates to the manufacture of carbon pigments, and is particularly directed to an improved design of carbon pigment producing furnace. The carbon pigment producing furnace which forms the subject of the present invention represents an improved design of our furnace as disclosed in the copending process application of George L. Heller and Carl W. Snow, Serial No. 87,657, filed June 27, 1936. Likewise the furnace of the present invention represents an improvement on the carbon pigment furnace which is described in the United States patent of David J. Beaver, No. 1,902,753, granted March 21, 1933.

The process inventions of the Beaver patent and of the Heller and Snow application above referred to are based on the discovery that carbonaceous pigments can be produced in high yield by partial, secondary combustion of natural gas within a combustion chamber into which the gas and air are directed in a plurality of alternate thin, wide contacting sheets, while thin viscous flame fronts are formed and maintained around each sheet of gas as the gas and air move forwardly through the combustion chamber in parallel streamline non-turbulent flow relation out of contact with solid or liquid surfaces.

The present invention has among its primary objects to provide an improved carbon pigment producing furnace which is designed on the same basic principle as the furnace of the aforementioned Beaver patent, the improvements in design being directed toward more efficient conversion of the natural gas or other hydrocarbon gas into a marketable finely divided carbon product, and the more efficient protection of the product as originally formed against deterioration by harmful secondary reactions.

With the above objects in mind one feature of the invention contemplates a furnace chamber having its longest axis disposed in a substantially horizontal plane, and having its forward portion partitioned into a plurality of relatively deep and narrow reaction chambers of uniform unobstructed cross section all communicably connecting with a single large unobstructed mixing and blending chamber in the rearward portion of the furnace. The improved design further provides for introducing natural gas or other hydrocarbon gas and sufficient air for developing reaction temperatures by partial combustion, in a plurality of alternate thin contacting parallel streams or sheets into the forward end of each reaction chamber, and for regulating the thickness of the air and gas sheets and their relative volumes and velocity rates so as to cause them to flow in contacting relation without substantial turbulence throughout the length of each reaction chamber. The streams of gas and air enter each reaction chamber through a plurality of superimposed narrow alternate air and gas burner slots or ducts, and the velocities of the respective gas and air streams are preferably substantially equal as they enter the reaction chamber. Under these conditions mixing of the gas and air occurs within the reaction chamber substantially solely as a result of diffusion, so that conditions favorable for combustion only occur at the interface between the gas and air streams.

Under the conditions of preferred operation which the present furnace is designed to promote, the high temperatures which develop by partial combustion at the interfaces of the gas and air streams cause thermal reactions of the gas within the flame envelope surrounding each gas stream. Such thermal reactions produce finely divided solid hydrocarbon particles which are carried along by the gas within a viscous gaseous envelope of hot combustion gases. The major portion of the heat required for raising the temperature above that at which dissociation of the gas occurs is transmitted by radiation directly from each luminous flame to the gas streams or sheets behind adjacent flames.

Each gas stream is entirely surrounded by an air stream and by combustion gases during its passage through the reaction chamber and the furnace is designed so that the total cross sectional area of each chamber is substantially equal to the total cross sectional areas of the combined air and gas streams at the point where such streams first contact on entering the combustion chamber. The furnace design is directed toward insuring substantially streamline flow of the gas and air streams out of contact with any surface which might have an inhibiting or anti-catalyst effect on recovery of maximum yields of high quality carbon pigments.

With the above and other objects and features in view, the invention resides in the improved carbon pigment furnace which is hereinafter described and more particularly defined by the accompanying claims.

In the following description of the invention reference will be made to the accompanying drawing, in which.

Figure 1:
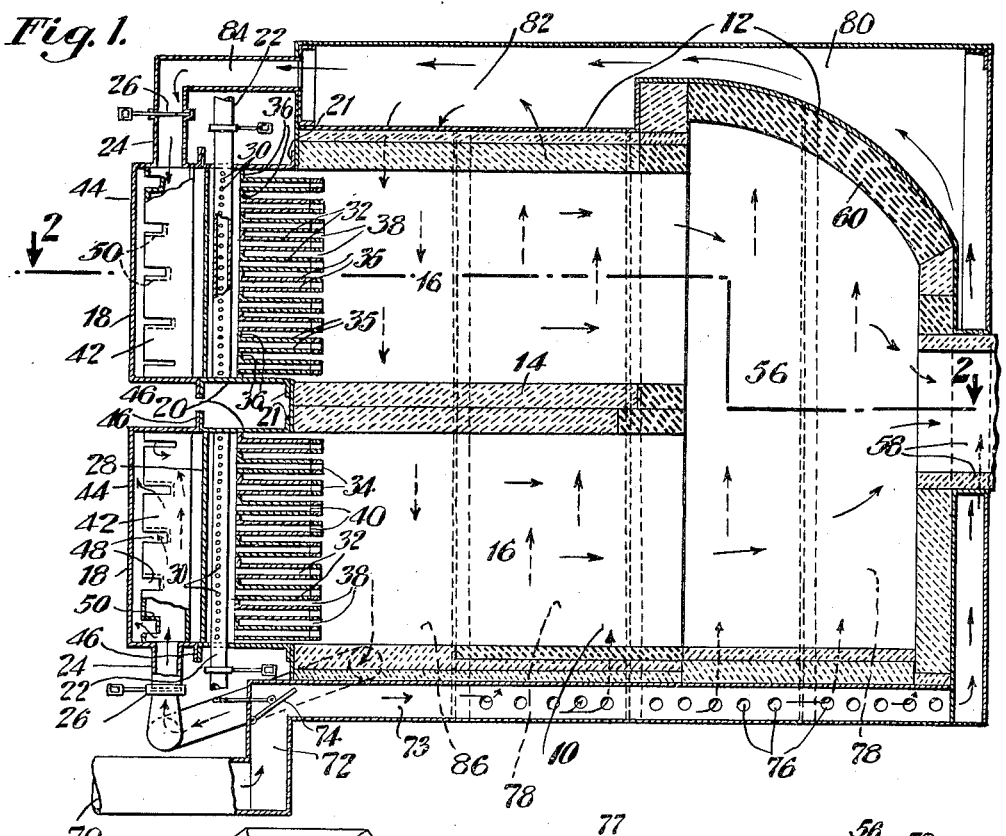
Fig. 1 is a vertical section through a furnace embodying improved design features of the present invention, certain parts of the furnace, particularly the burners, being shown out of scale in order to better illustrate the design.

In the drawing numeral 10 designates a furnace having refractory insulating floor, roof and walls 12, and embodying in its forward portion vertically and horizontally disposed partition walls 14 which divide the front part of the furnace into several relatively deep, long and narrow individual reaction chambers 16 each having its major axis horizontal. At the forward end of each reaction chamber 16 there is mounted a burner element 18 which is supported at the front wall of the furnace and forms a closure for the front end of the corresponding reaction chamber 16. Each burner element 18 is provided with a metal casing 20 which is contoured and dimensioned to fit the front end of one of the reaction chambers 16 and which is attached to the front wall of the furnace by flanges 21. These burner elements 18 serve as hydrocarbon gas and air supply ducts for the furnace and are disposed on the front wall of the furnace to afford ease of access for purposes of rapid removal, cleaning, replacement, and to dissipate radiant heat which is transmitted to the burner.

The natural gas or other hydrocarbon gas which is to be dissociated in the furnace for the production of carbon pigments is introduced to each of the burners 18 through an individual valve controlled gas supply pipe 22. Air for supporting secondary combustion of the gas within the furnace is conducted to each of the burners through individual air supply pipes 24 past air flow control dampers 26. Pressure regulating valves and flow meters (not shown) are connected in the main gas and air supply pipes to assist the operator in maintaining the desired ratio of gas and air.

Within the burner elements 18 the individual gas supply pipes 22 are each enclosed by a vertical gas supply manifold 28 which is conveniently constructed in the form of a rectangular box. Manifold 28 forms a part of the gas supply, and the portion of the corresponding gas feed pipe 22 which lies within the manifold is drilled with two rows of small apertures 30 (about 1/8" diameter) which face at an angle toward the back of the burner. The total cross sectional area of the apertures 30 is preferably only about 75% of the cross sectional area of the pipe 22, so that as the gas is supplied to the pipe 22 under low pressure the apertures 30 form a series of small orifices which distribute the gas evenly throughout the length of manifold 28. As the gas exits through the apertures 30 into the manifold it impinges on the back of the manifold and its direction of flow is reversed toward the front of the furnace, the gas passing from the manifold 28 into a plurality of spaced superimposed gas burner ducts 32. Each burner duct forms the gas into a thin wide sheet in which form the gas issues from each burner tip 34. In one operating furnace the burner is built up of a large number (34) of gas ducts having chrome steel tips about 1/4 inch thick and 8 1/2 inches wide (inside dimensions), such ducts being uniformly spaced about 1 inch apart and discharging into a reaction chamber 16 the major dimensions of which are: width 12 inches, height 36 inches, and length 6 feet 9 inches.

Figure 3:
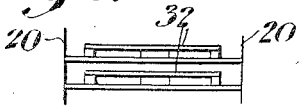
Fig. 3 is an enlarged view in vertical elevation looking toward the discharge end of one of the burner tips.

Each of the burner ducts 32 is constructed of a pair of uniformly spaced horizontally disposed chrome steel plates or vanes 35. The upper vane tapers in width (for example) from a full 8 1/2 inch width of the burner at the vertical plane of the burner tip, to an approximately 4 inch width at the vertical plane at which the plates are attached to the front end of the gas distributor box 28. The upper one of each pair of plates is provided with a spacing angle 36 by which it is attached to the front of the manifold 28, and by which the upper plate of each burner duct is spaced from the lower plate of the adjacent overlying burner duct. The gas exit end of each burner duct has a width which may vary within limits of 2 inches to 4 inches less than the width of the corresponding combustion chamber 16. The lower plate of each burner duct has a width corresponding to the width of the burner casing 20 to which the edges of the plate are attached, so that each pair of adjacent lower burner duct plates partitions the burner casing into air ducts 38 surrounding the burner ducts 32 (see Fig. 3) and distributing air for combustion equally between all of the gas ducts. By this burner construction the air and gas supplies to the furnace are directed in parallel streamline flow before the air and gas come into contact at the forward end of each of the individual reaction chambers 16.

The tips 34 of each burner duct 32 are exposed to high temperatures, and accordingly must be constructed so as to withstand such high temperatures without warping or oxidation and without catalytic effect on the decomposition of the gaseous hydrocarbon which is introduced to the furnace therethrough. A high chromium steel or alloy of chromium and iron containing 25% or more of chromium and less than 75% of iron, has proved to be a suitable material for use in constructing the burner tips, and an alloy of lower chromium content (12%) may be used for the burner vane construction. Other high temperature alloys may be used in constructing the burner tips, such for example as alloys of iron and tungsten, manganese and vanadium containing less than 75% iron and substantially no nickel, copper or silicon. The burner tips are secured to the burner vanes by socket or welded joints indicated by the numerical designation 40.

The air supply for supporting partial combustion of the gas enters the furnace from the feed line 24 through an air distributor manifold 42 which consists of a cylindrical pipe mounted eccentrically in a half round casing 44. The forward end of casing 44 is attached to the burner casing 20 by a flange 46. Air supply manifold 42 receives air under the pressure of a rotary blower or other source of low pressure air (not shown) and distributes the air uniformly throughout the height of the casing 44 through slots 48 which are cut in the rear wall of the manifold. Slots 48 are uniformly dimensioned as to area, but are made gradually narrower and longer in direct ratio to the distance separating the slot from the inlet of manifold 42. Baffles 50 are placed within manifold 42 behind each slot 48 for the purpose of intercepting the air entering the manifold and deflecting it outwardly through the slots to the rear wall of casing 44, by which the direction of air flow is reversed and the air is thereby distributed uniformly to the air ducts 38 throughout the full height of combustion chamber 16. The areas of the baffles 50 vary directly with the distance separating them from the inlet port of manifold 42. In one design such baffle area variation ranges from 1/6th through 1/5th, 1/4th, 1/3rd, 1/2 to 1 of the total inside area of the manifold 42.

Figure 2:
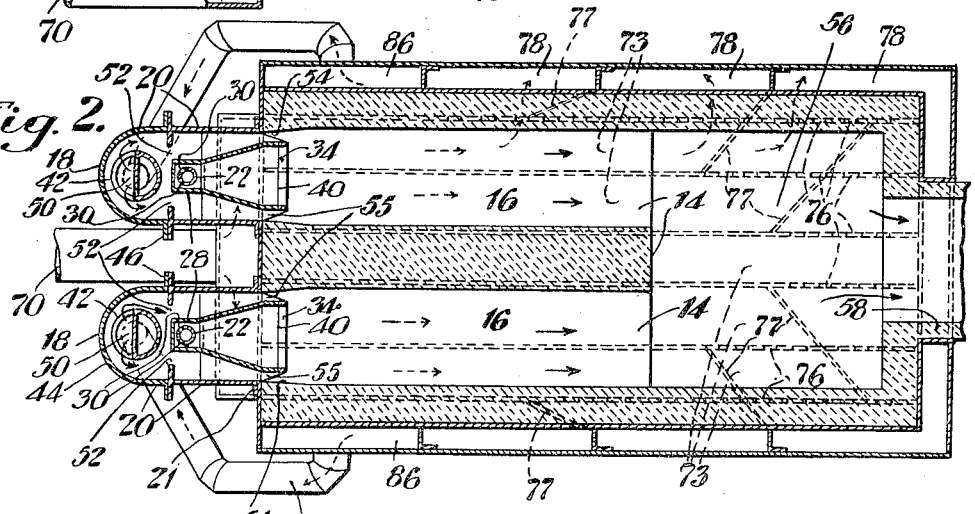
Fig. 2 is a horizontal cross section through the furnace taken along the plane 2—2 of Fig. 1.

As the air flows forwardly from the rounded rear end of air casing 44 toward the burner air ducts 38 some of it passes through a restriction 52 (Fig. 2) which is positioned forwardly of the gas distributor box 28 in about the vertical plane of the flange 46 of the burner casing. This restriction further promotes uniform distribution of the air to all parts of the burner, and insures that the air flows in equal volume and at equal velocity into the air ducts 38, where any turbulence is smoothed out before the air passes beyond the vertical plane of the burner tips. The inside face of the flange 21 is shown in Figs. 1 and 2 as protected by a refractory shield 54 in and adjacent the vertical plane of the burner tip, this shield 54 forming in effect an extension of the inner walls of reaction chamber 16 rearwardly of the burner tip. The inside side wall surface of the shield 54 tapers in a direction away from the burner tip and away from a restriction 55 in the plane of the burner tips. This construction assists in inhibiting the development of turbulence in the gas and air sheets issuing from the burner into the reaction chamber, and also permits a certain amount of wall expansion in the zone of the burner tip without interference with the symmetry of the flames issuing from the burner.

The reaction chambers 16 are proportioned as to length in accordance with the volume of hydrocarbon which is reacted, so as to insure conversion of the gaseous hydrocarbon to a solid, finely-divided product during the period in which the gas, emitted from the burners, traverses the length of the reaction chamber. The length of each reaction chamber in a commercial furnace lies within the range 5 ft.–7 ft., and the width in the range 8 inches–12 inches.

The mixture of products of combustion laden with carbon pigment which is produced in each of the reaction chambers discharges into a common large mixing and blending chamber 56 occupying the rear portion of the furnace 10, from which the mixture of gases is led off through an air cooled offtake pipe 58. After traversing the offtake pipe 58 the gases are further cooled by water quenching, and the carbonaceous pigment is separated therefrom by electrical precipitators or other separating means (not shown). The design of the blending chamber 56 is such as to insure travel of the gases laden with pigment throughout the length thereof without substantial reduction of velocity, but with the development of turbulence which inhibits accretion or particle growth. An arched roof 60 is provided for the blending chamber 56 to assist in retention of radiant energy within the reaction chambers 16, and to insure against substantial reduction in flow rate of the gases in traversing the furnace from the burner tip to the inlet of offtake 58. In one such furnace the total distance from the burner tips to the inlet end of pipe 58 is approximately 12 feet.

As the gas travels forward from a burner tip into and through the corresponding reaction chamber 16, the hydrogen which is liberated by the thermal reactions which take place within the gas sheet or stream diffuses more rapidly than the hydrocarbon into the air stream or air blanket surrounding the gas stream. By following the streamline method of combustion the hot burning gases within each flame front have a comparatively high viscosity, so that the finely divided solid carbon and/or hydrocarbons which are formed by the heat developed within the gas stream inside of the flame front are substantially all held against the inner face of the viscous flame, and pass forwardly through the furnace into the blending chamber 56 in a definite non-turbulent or streamline path without coming in contact with solid surfaces. By this method of operation the finely divided solid is carried in suspension rapidly through the high temperature reaction zone without becoming oxidized and without becoming graphitized by contact with solid surface or by too long exposure to high temperatures.

Because of the high temperatures which are developed within the furnace, and particularly within the reaction chambers 16, it is necessary to employ refractory containing a high percentage of alumina or other high temperature resistant refractory material, particularly in the zones of the furnace exposed to the highest temperatures. To minimize expansion and contraction stresses and destruction and disintegration of the refractory by spalling, the furnace is preferably constructed of graded refractory arranged in such a way that the roof of the blending chamber 56 and the end sections of the partitions 14 and floor which lie adjacent to the blending chamber 56 are preferably constructed of refractory brick containing upwards of 70% alumina, while the remainder of the floor, side and rear walls and the inner linings of the forepart of the reaction chambers 16 are constructed of alumina brick containing alumina in the proportion of about 60%. These linings are backed up with brick work of good heat insulating properties, and the whole furnace structure is designed to minimize development of stresses in the brickwork and steel casing, and to allow for ample expansion without disintegration or spalling. Variations in expansion stresses are equalized by grading the bricks as to their alumina content substantially in direct proportion to the temperatures to which they are exposed within the furnace.

The furnace incorporates another feature which adds to the efficiency of operation and the life of the furnace, and that is the provision for simultaneously air cooling the floor, walls and roof of the furnace while preheating the air supplied for supporting partial, secondary combustion within the furnace, thereby increasing the heat utilization efficiency of the carbon pigment production for which the furnace is designed.

The circuit followed by the air supply through the furnace is indicated in Figs. 1 and 2 as including a main air supply pipe 70 which conducts the air from a blower or other source of low pressure air (not shown) into an air distributor manifold 72 located in front of and beneath the floor of the furnace. From manifold 72 the air enters passages 73 formed by longitudinal channels extending throughout the length of the furnace beneath the floor, being distributed from the manifold 72 uniformly through each of the passages 73 by means of control dampers 74 located at the inlet end of each passage 73. The air flows through the passages toward the back wall of the furnace, and the channels separating the passages are provided with apertures 76 through which the air flows and is directed by baffles 77 outwardly toward upright passages 78 in the side and back walls of the furnace, through which the air is conducted into other passages 80 built into the roof of the furnace.

After entering a distributing manifold 82 overlying the front portion of the furnace, part of the preheated air passes through pipes 84 into pipes 24 supplying air to each of the upper set of burners 18, while additional preheated air flows downwardly through down passages 86 in front side wall of the furnace and thence through pipes 88 into pipes 24 supplying the lower rows of burner elements 18. Each of the burner elements is supplied with air in amount which is controlled by the calibrated dampers 26 in the individual air supply ducts 24.

The individual burner ducts 32 are sized within optimum limits of $\frac{1}{8}$–$\frac{1}{2}$ inch thickness, and 6 inches to 10 inches width (inside dimensions). The ratio of the total cross sectional inner perimeter of the burner ducts to their total inner cross sectional area at their outlet ends lies in the range 4 to 11. When supplying ordinary natural gas of a heating value of about 1000 B. t. u./cu. ft. to the furnace for conversion to a finely divided carbonaceous rubber reenforcing pigment, the optimum cross sectional area ratio of burner air ducts to gas ducts is about 4.5. Depending on the gas being handled, this ratio may be varied within limits to supply sufficient air to burn 30% to 80% of the gas.

The furnace is constructed for operation within temperature limits of 2000–2800° F. The use of multiple thin narrow wide burners is an important feature of the construction whereby carbonaceous pigment is produced within thin broad and flat flames, thereby insuring formation of a maximum amount of solid carbon or hydrocarbon within each flame through activation by direct radiation from other flames. The hydrocarbon gas thereby forms the raw material for production purposes and also the source of energy for the conversion.

The invention having been thus described, what is claimed as new is:

1. Apparatus adapted for producing carbon pigment from gaseous hydrocarbons by partial secondary combustion comprising, a furnace chamber with refractory heat insulating floor, side walls and roof and having an unobstructed gas blending chamber in its rearward interior portion and a plurality of refractory partitions in its forward portion, said partitions forming individual unobstructed reaction chambers each substantially uniform in cross section throughout its length and each communicating at its rearward end with the blending chamber, uninsulated gas burner units each of substantially the same cross sectional area as a reaction chamber and each comprising a plurality of uniformly spaced horizontally disposed narrow gas ducts mounted in parallel superposed rows at the forward end of each reaction chamber and connected with a common source of gas, together with air ducts surrounding each of the gas ducts and connected with a common source of air, and a large refractory lined gas offtake pipe leading off horizontally from the rearward end of the blending chamber.

2. Apparatus as defined in claim 1 together with communicably connecting air passages in the floor, side walls and roof of the furnace, and means for distributing air which has been preheated in said passages at a controlled rate to each gas burner air duct.

3. Apparatus as defined in claim 1 in which the refractory linings of the furnace and the partition walls comprise high alumina brick graded in its alumina content in accordance with variations in temperature at different parts of the furnace to minimize expansion stresses.

4. Apparatus as defined in claim 1 in which the gas burner units form closures for the forward end of each reaction chamber and are housed in a metal casing conforming closely in contour with the surrounding walls of the reaction chamber and attached thereto by flanges, which flanges are in turn protected interiorly by a refractory shield having an inner wall which tapers away from the burner ducts to merge with the inner wall of the reaction chamber at a short distance in front of the vertical plane of the burner tips.

5. Apparatus as defined in claim 1 in which the ratio of the total cross sectional perimeter of the burner ducts at their outlet ends to their total inner cross sectional area adjacent the said ends lies in the range 4 to 11, and in which the area ratio of the gas ducts and air ducts at their outlet ends is normally about 1:4.5 and is proportioned to supply sufficient air to burn 30% to 80% of the gas.

6. Apparatus as defined in claim 1 in which each gas burner embodies at its forward end an air distributor comprising a semi-cylindrical casing which communicably connects with the gas burner air ducts, a cylindrical air supply conduit mounted eccentrically in the casing and provided with uniformly spaced rear wall slots of equal area and baffles behind each slot having areas which vary directly with their distance away from the inlet end of the conduit, whereby to deflect incoming air through the slots and against the rounded end of the casing at a rate which is substantially uniform throughout the length of the casing.

7. Apparatus as defined in claim 1 in which each burner duct is provided with a high temperature resistant burner tip comprising an alloy consisting of at least 25% chromium and less than 75% of iron by weight.

8. Apparatus as defined in claim 1 in which each of the gas burner ducts has a uniform thickness in the range $\frac{1}{8}$ inch–one-half inch, and in which each of the combustion chambers has a width of approximately 8 inches–12 inches and a length of about 5 ft.–7 ft.

GEORGE L. HELLER.
HAROLD M. WILGUS.